(12) United States Patent  
Lee et al.

(10) Patent No.: US 7,952,830 B2
(45) Date of Patent: May 31, 2011

(54) METHOD AND APPARATUS FOR ESTIMATING FLYING HEIGHT IN A HARD DISK DRIVE

(75) Inventors: SungChang Lee, San Jose, CA (US); Yawshing Tang, Saratoga, CA (US); Mike Suk, Palo Alto, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 70 days.

(21) Appl. No.: 12/478,716

(22) Filed: Jun. 4, 2009

(65) Prior Publication Data

US 2010/0309578 A1  Dec. 9, 2010

(51) Int. Cl.
 *G11B 21/02* (2006.01)
(52) U.S. Cl. .......................................................... 360/75
(58) Field of Classification Search .......................... None
 See application file for complete search history.

(56) References Cited

U.S. PATENT DOCUMENTS

| | | | | |
|---|---|---|---|---|
| 7,046,463 | B2 * | 5/2006 | Gay Sam et al. | 360/25 |
| 7,349,170 | B1 * | 3/2008 | Rudman et al. | 360/75 |
| 7,369,341 | B2 * | 5/2008 | Yokohata et al. | 360/31 |
| 7,430,083 | B2 * | 9/2008 | Loh et al. | 360/31 |
| 7,508,617 | B1 * | 3/2009 | Mak et al. | 360/75 |
| 7,509,728 | B1 * | 3/2009 | Schreck et al. | 29/603.03 |

* cited by examiner

*Primary Examiner* — K. Wong

(57) ABSTRACT

This application discloses a hard disk drive and operates it based upon using a first and third harmonic amplitude generated from reading a repeated pattern of bits written to a track on a disk surface. Both amplitudes are used to create a first data set and the third harmonic amplitude is used as a single tone to create a second data set. A conversion factor between these two is determine, which may be used to convert the first data set under other conditions into a temperature insensitive table of the electrical stimulus of a vertical micro-actuator and the flying height change of the slider. The hard disk drive may be calibrated during manufacture and/or in the field.

10 Claims, 4 Drawing Sheets

Fig. 2A  Head stack assembly

METHOD AND APPARATUS FOR ESTIMATING FLYING HEIGHT IN A HARD DISK DRIVE

TECHNICAL FIELD

This invention relates to the estimation of flying height of a slider over a rotating disk surface in a hard disk drive.

BACKGROUND OF THE INVENTION

This application uses a previously known method called the Wallace spacing loss equations as found in U.S. Pat. No. 5,130,866, issued in 1992 to estimate flying height clearance, given a predetermined pattern being read with a recording wavelength of $\lambda$ of the first harmonic, with the first harmonic amplitude at flying state a being $A_{a-1st}$ and the $k^{th}$ harmonic amplitude at flying state a being $A_{a-kth}$. The spacing change $\Delta d$ between flying state a and flying state b is given in terms of the ratios of first and third harmonics as $$\Delta d = (\lambda/4\pi)\ln(A_{a-1st}A_{b-3rd}/A_{b-1st}A_{a-3rd}) \quad (1)$$

This spacing change may also be calculated based upon a single tone by $$\Delta d = (\lambda/4\pi)\ln(A_{a-1st}/A_{b-1st}) \quad (2)$$

SUMMARY OF THE INVENTION

There are problems with the Wallace spacing loss equations. First, track width is not infinite. Second, while patterns of increased frequency improve accuracy, there are limits to how fast a hard disk drive can keep up. A hard disk drive may use a repeated pattern written to at least part of a track within those limits to estimate the flying height change for two flying states resulting from different voltages applied to a vertical micro-actuator to alter the flying height of a slider over the track. Two data sets are generated, the first uses the first and third harmonic amplitude as in equation (1) and the second uses the third harmonic amplitude as a single tone in (2) to create tables of the voltage applied to the vertical micro-actuator and the change in flying height. The slope of the first and second data sets are calculated as the change in flying height over electrical stimulus, voltage. A conversion factor as the ratio of these two slopes is calculated, which has been found to be essentially constant across a wide range of temperatures. The hard disk drive may be calibrated using the first and third harmonic amplitudes in equation (1) and once scaled by this conversion factor to create tables of the flying height changes for various voltages applied to the vertical micro-actuator for the tested temperature conditions.

The hard disk drive may be calibrated during manufacture and/or may be recalibrated in the field with this method. The calibrated hard disk drive and the table of stimulus to flying height are products of this method. The method may be embodied as a program system residing in computer readable memory for instructing a computer operating the hard disk drive, where the memory may or may not be included in the hard disk drive.

BRIEF DESCRIPTION OF THE DRAWINGS

FIG. 2A shows a perspective view of the voice coil motor, its head stack assembly and the one or more head gimbal assemblies coupled to the one or more actuator arms of FIG. 1.

DETAILED DESCRIPTION

This invention relates to estimation of flying height of a slider over a rotating disk surface in a hard disk drive. There are problems with the application of the Wallace spacing loss equations. First, the written track width is not infinite, which will be referred to as the narrow channel effect. Second, while the accuracy of the equations improves with written patterns of increased transition density or increased frequency at a fixed disk linear speed. However, increasing the written pattern density decreases the signal amplitude.

Figure 1:
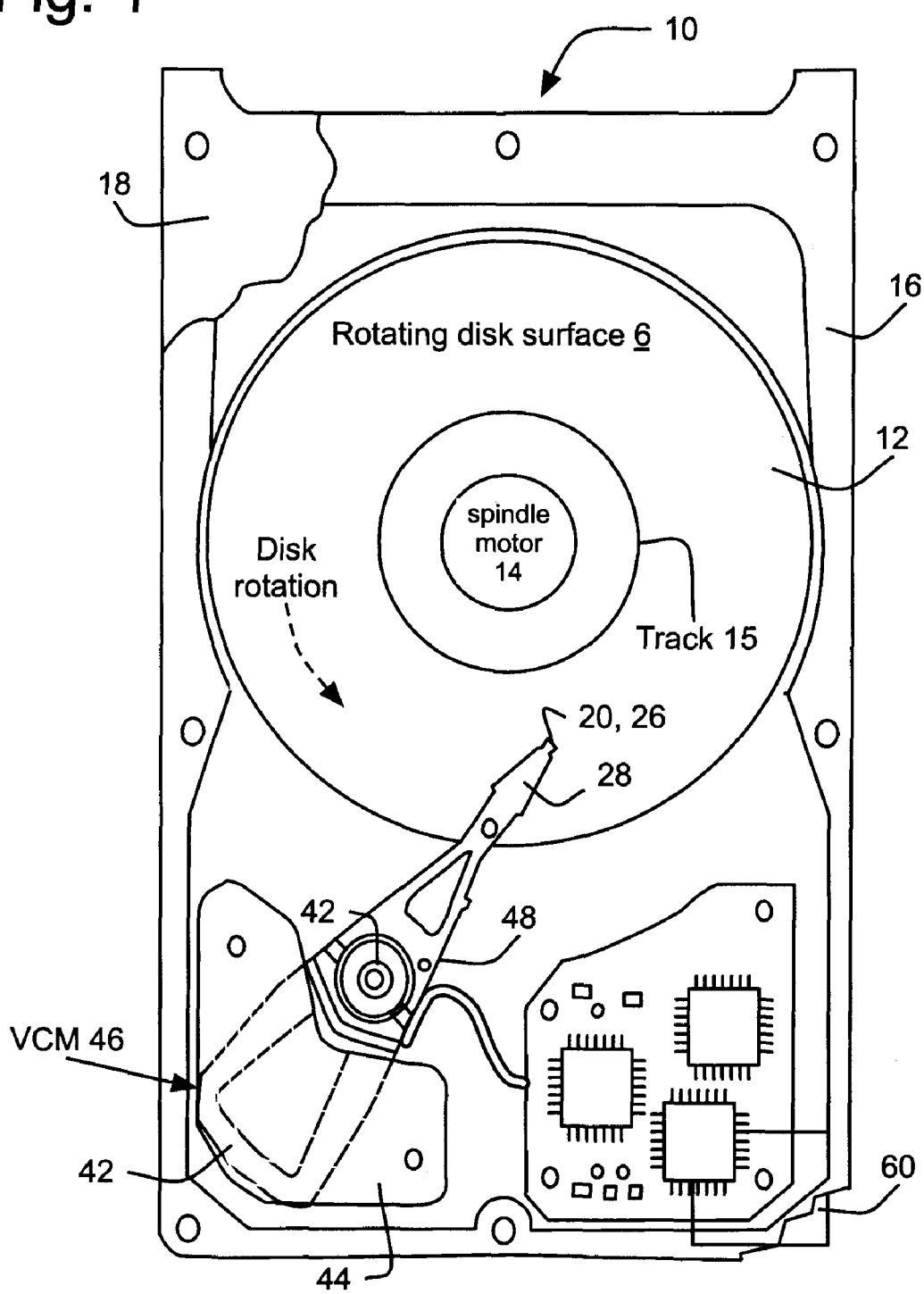
FIG. 1 shows an example of an embodiment of the invention as a hard disk drive including a disk base to which a spindle motor is mounted with at least one disk coupled to the spindle motor to create a rotating disk surface. A voice coil motor includes a head stack assembly pivotably mounted by an actuator pivot to the disk base, responsive to its voice coil interacting with a fixed magnetic assembly mounted on the disk to position at least one slider to access data stored on the rotating disk surface. The hard disk drive includes a circuit board also mounted on the disk base opposite the spindle motor and the voice coil motor that may be used to estimate the flying height and control the spindle motor, the voice coil motor and/or the slider.

Referring to the drawings more particularly by reference numbers, FIG. 1 shows an example of an embodiment of the invention as a hard disk drive 10 including a disk base 16 to which a spindle motor 14 is mounted with at least one disk 12 rotatably coupled to the spindle motor to create a rotating disk surface 6. A voice coil motor 46 includes a head stack assembly pivotably mounted by an actuator pivot 42 to the disk base, responsive to its voice coil 42 interacting with a fixed magnetic assembly 44 mounted on the disk base and including a head gimbal assembly 28 with a micro-actuator hinge 26 configured to position at least one slider 20 to access data in a track 15 stored on the rotating disk surface. A repeated pattern of 0's and 1' be may written to at least part of the track to create a pattern with a primary frequency with a first harmonic amplitude and a third harmonic amplitude at a higher frequency. A circuit board 60 may be mounted on the disk base opposite the spindle motor and the voice coil motor. A disk cover 18 may be mounted on the disk base to encapsulate all of the shown components except the circuit board.

The hard disk drive 10 may access the data 15 arranged in tracks on the rotating disk surface 6 by controlling the spindle motor 14 to rotate the disks 12 at a specific rate. The data may be organized as tracks that may be configured as concentric circles or as a tightly packed spiral. The voice coil motor 46 operates by stimulating the voice coil 42 with a time varying electrical signal to magnetically interact with the fixed magnet assembly 34 causing the head stack assembly to pivot about the actuator pivot 40 moving the head gimbal assembly 28 to position the slider 20 near the track on the rotating disk surface. In many embodiments, a micro-actuator assembly preferably coupled to the slider may be further stimulated to further control the position of the slider. A vertical micro-actuator either in the micro-actuator assembly, or preferably in the slider, may be stimulated to alter the flying height of the slider over the rotating disk surface.

FIG. 2A shows a perspective view of the voice coil motor 45, its head stack assembly and the one or more head gimbal assemblies 28 coupled to the one or more actuator arms 48 of FIG. 1. The head stack assembly is configured to pivot about the actuator pivot 30.

Figure 2B:
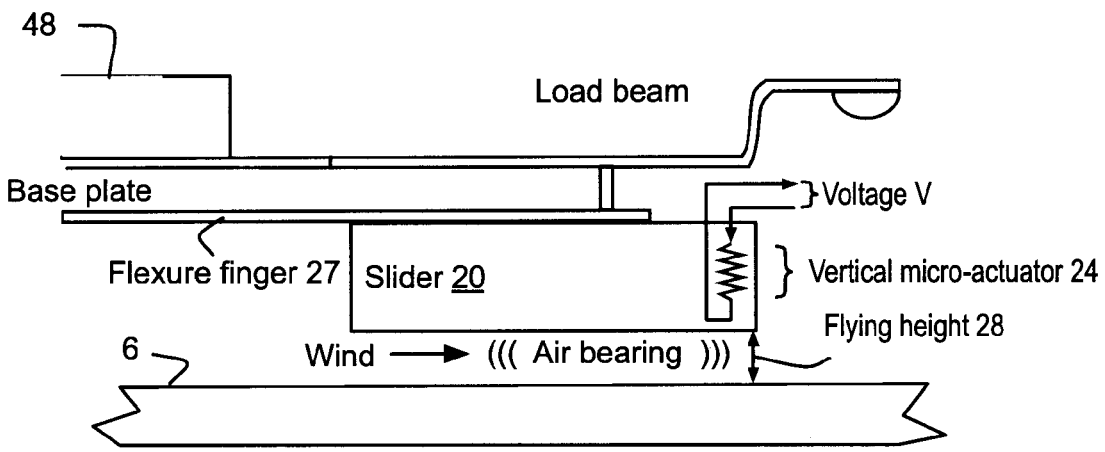
FIG. 2B shows a side view of some details of the head gimbal assembly of the previous Figures, in particular, showing the flying height of the slider over the rotating disk surface and a vertical micro-actuator stimulated by a voltage to alter the flying height. While the vertical micro-actuator is shown included in the slider, in other embodiments of the invention, the vertical micro-actuator and the slider may be separate.
Figure 2B:
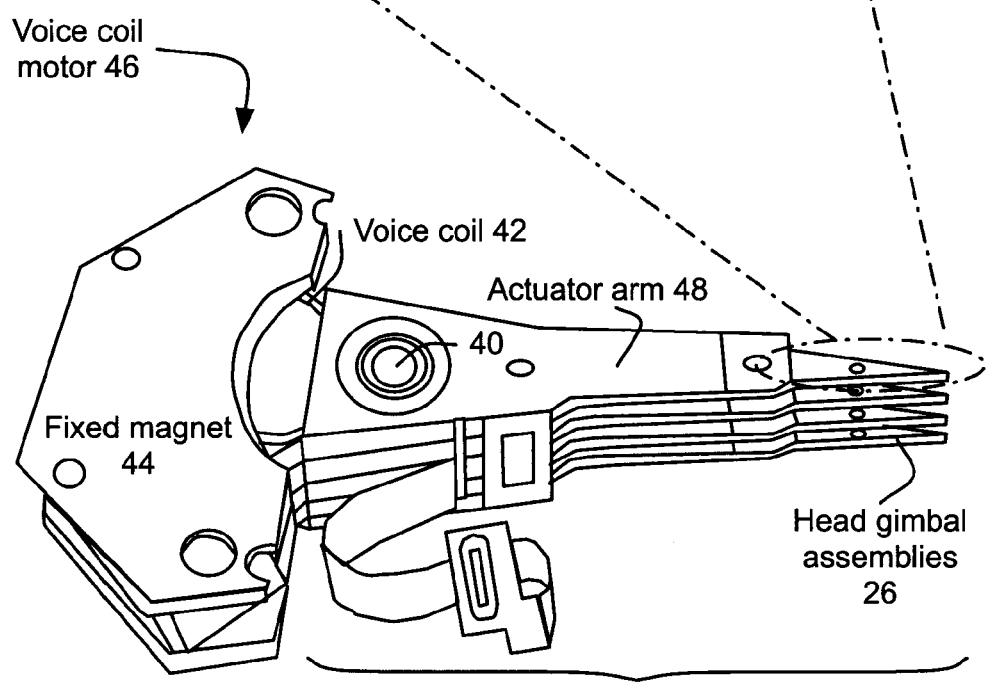

FIG. 2B shows a side view of some details of a head gimbal assembly 26 of the previous Figures, in particular, a flexure finger 27 coupled to the slider 20 by which a voltage V may be delivered to a vertical micro-actuator 24 to change the flying height 28 of the slider over the rotating disk surface 6. While the vertical micro-actuator is shown included in the slider, in other embodiments of the invention, the vertical micro-actuator and the slider may be separate. Alternatively, the flexure finger may include the vertical micro-actuator. In either case, the flexure finger may supply the electrical stimulus to the vertical micro-actuator, symbolized here as a voltage V. While either approach to vertical micro-actuation may employ a thermal-mechanical effect, a piezoelectric effect, and/or an electro-static effect, this portrayal of the vertical micro-actuator shows a resistor, which is often associated with thermal-mechanical actuation. This has been done to simplify the discussion and is not intended to limit the scope of the invention. Alternative stimulation of a vertical micro-actuator may include controlled voltage and/or current sources. The slider may use a perpendicular or longitudinal recording approach to accessing data on the rotating disk surface and may employ a magneto-resistive effect or a tunneling effect to read the data.

As previously mentioned, there are problems with the application of the Wallace spacing loss equations. First, the written track 15 width is not infinite, which will be referred to as the narrow channel effect. Second, while the accuracy of the equations improves with written patterns of increased transition density or increased frequency at a fixed disk linear speed. However, increasing the written pattern density decreases the signal amplitude.

The hard disk drive 10 may use a repeated pattern written to at least part of the track 15 within those limits to estimate the flying height change $\Delta d$ for two flying states resulting from different voltages V applied to a vertical micro-actuator 24 to alter the flying height 28 of the slider 20 over the track. Two data sets are generated, the first uses the first harmonic amplitude 102 and the third harmonic amplitude 104 as in equation (1) and the second uses the third harmonic amplitude as a single tone in equation (2) to create tables 110 of the voltage applied to the vertical micro-actuator and the change in flying height. The slope of the first and second data sets are calculated as the change in flying height over electrical stimulus, which is voltage in this example. A conversion factor 108 as the ratio of these two slopes is calculated, which has been found to be essentially constant across a wide range of temperatures.

The hard disk drive 10 may be calibrated using the first and third harmonic amplitudes 102 and 104 in equation (1) and once scaled by this conversion factor to create tables 110 of the flying height changes for various voltages applied to the vertical micro-actuator 24 for the tested temperature conditions.

Figure 3:
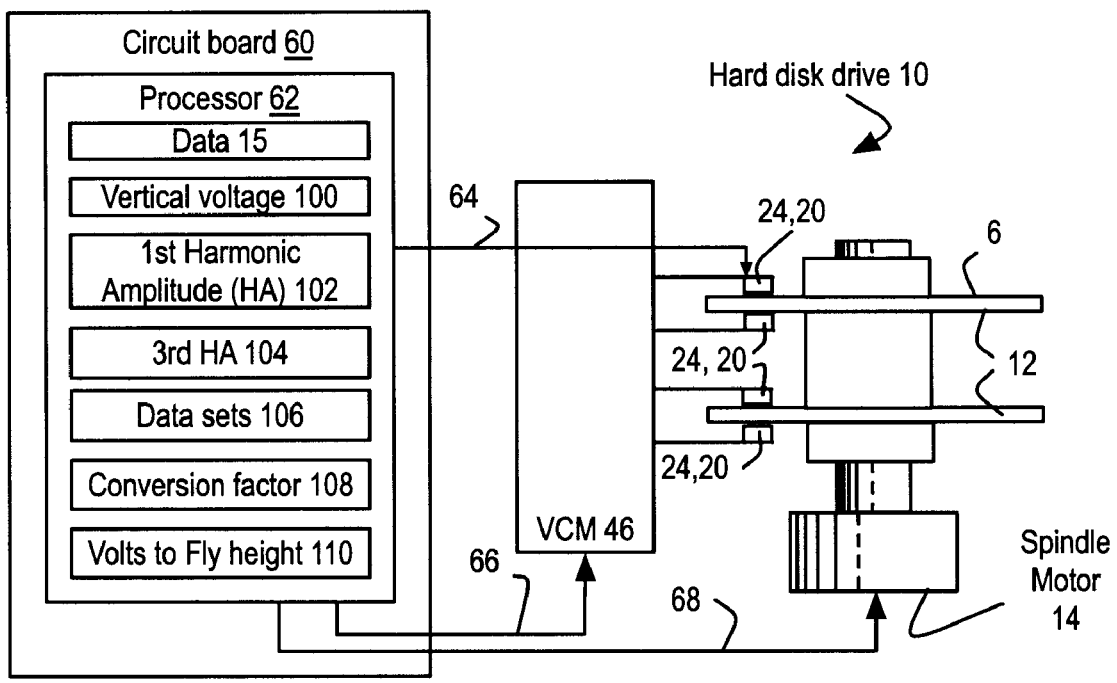
FIG. 3 shows a simplified electrical schematic of the hard disk drive of FIG. 1 where the circuit board includes a processor configured for electrical connection across the voice coil motor to the vertical micro-actuator to alter the flying height of the slider over the rotating disk surface. The processor may be configured to stimulate the voice coil motor and possibly other micro-actuators to position the slider over the rotating disk surface near the track. The processor may further stimulate the spindle motor to rotate the disks of the hard disk drive to create the rotating disk surfaces. The processor may assert a vertical voltage to create the flying height of the slider which reads the track with its previously written pattern to create the first harmonic amplitude and third harmonic amplitude to create the entries for the first and second data sets. The processor then calculates the conversion factor as the ratio of the slopes of the first and second data sets. A table of electrical stimulus, in this embodiment voltage, applied to the slider's vertical micro-actuator to flying height change is then built using the first data set and the conversion factor.

FIG. 3 shows a simplified electrical schematic of the hard disk drive 10 of FIG. 1 where the circuit board 60 may include at least one processor 62 configured for electrical connection 64 across the voice coil motor 46 to the vertical micro-actuator 24 to alter the flying height 28 of the slider 20 over its rotating disk surface 6. The processor may also stimulate 66 the voice coil motor 46 and possibly other micro-actuators that have not been shown to position the slider over the rotating disk surface near the track 15. The processor may further stimulate 68 the spindle motor 14 to rotate the disks 12 of the hard disk drive to create the rotating disk surfaces. The processor may assert a vertical voltage 100 to create the voltage V at the vertical micro-actuator 24 to change the flying height of the slider as it reads the track with its previously written pattern to create the first harmonic amplitude 102 and third harmonic amplitude 104 to create the entries for the first and second data sets 16. The processor may then calculate the conversion factor 108 as the ratio of the slopes of the first and second data sets. The volts to flying height table 110 may be built using the first data set and the conversion factor.

By way of example, writing a repeating pattern of bits in the track 15 that may consist of "01011010", known herein as a test pattern, has a first harmonic of $f_c/8$, where $f_c$ is the maximum channel frequency or clock rate. As used herein, this repeated patterns of bits may equivalently be represented as "01011010", "10110100", "01101001", and so on. At a stable temperature the third harmonic amplitude used in the single tone equation (2) is good enough. When the temperature changes, then using this two tone approach can compensate for the changing temperature. A low frequency harmonic is subject to the narrow channel effect. By using both the first and third harmonics, the effects of temperature change can be removed, though these estimates are still subject to the narrow channel effect. In fact the ratio of the first and third harmonics is actually noisier due to the narrow channel effect compared to just the third harmonic. The test pattern may have a first harmonic frequency of 120 Mega Herz (MHz). Note that using the third harmonic amplitude of the test pattern as a single tone is at a higher frequency than using the 2T pattern, ⅜ of the clock rate versus ⅔ of the clock rate. Note that a 4T pattern is various shifted forms of "00001111" and a 2T pattern is various shifted forms of "00110011". The test pattern may also be a 4T pattern.

Figure 4:
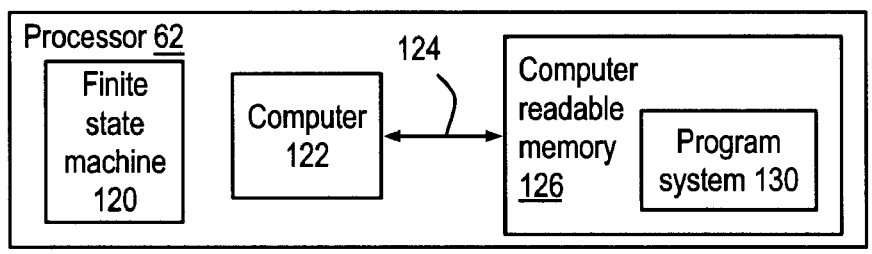
FIG. 4 shows a simplified block diagram of the processor including at least one instance of a finite state machine and/or a computer accessibly coupled via a buss to a computer readable memory containing a program system for instructing the computer to at least partly implement an embodiment of the invention's method. As used herein, the processor may or may not be included in the circuit board of FIGS. 1 and 3. For instance, during the manufacture of the hard disk drive, the processor and the computer readable memory may not be included in the hard disk drive.

FIG. 4 shows a simplified block diagram of the processor 62 of FIG. 3 including at least one instance of a finite state machine 120 and/or a computer 122 accessibly coupled 124 via a buss to a computer readable memory 126 containing a program system 130 for instructing the computer to at least partly implement an embodiment of the invention's method. As used herein, the processor may or may not be included in the circuit board 60 of FIGS. 1 and 3. For instance, during the manufacture of the hard disk drive, the processor and the computer readable memory may not be included in the hard disk drive.

As used herein a finite state machine receives at least one input and generates at least one output and may update and/or maintain at least one state, with at least one of the outputs being generated based upon the value of at least one of the inputs and/or the value of at least one of the states.

As used herein, a computer may include at least one data processor and at least one instruction, with each of the data processors being instructed by at least one of the instruction processors and at least one of the instruction processors are instructed by at least one program step of the program system 130 in accord with at least one of the invention's methods. The computer readable memory may or may not include a non-volatile memory that can retain its memory contents without an external supply of power.

Embodiments of the invention include a method of operating the hard disk drive 10 using the repeated pattern written to at least part of the track 15 to estimate the flying height change Δd for two flying states. The written part of the track may be a sector, multiple sectors and/or the whole track.

As used herein, starting a flowchart may include remembering at least part the states of the finite state machine 120, and/or at least part of the state of the computer 122, possibly by pushing a return state. The program steps may be implemented by states and/or state transitions in the finite state machine and/or as threads or tasks executed as program instructions by the computer. The exiting of the flowchart may include returning at least part of the state of the finite state machine and/or the computer, which may effect a return from a subroutine call in some situations.

Figure 5:
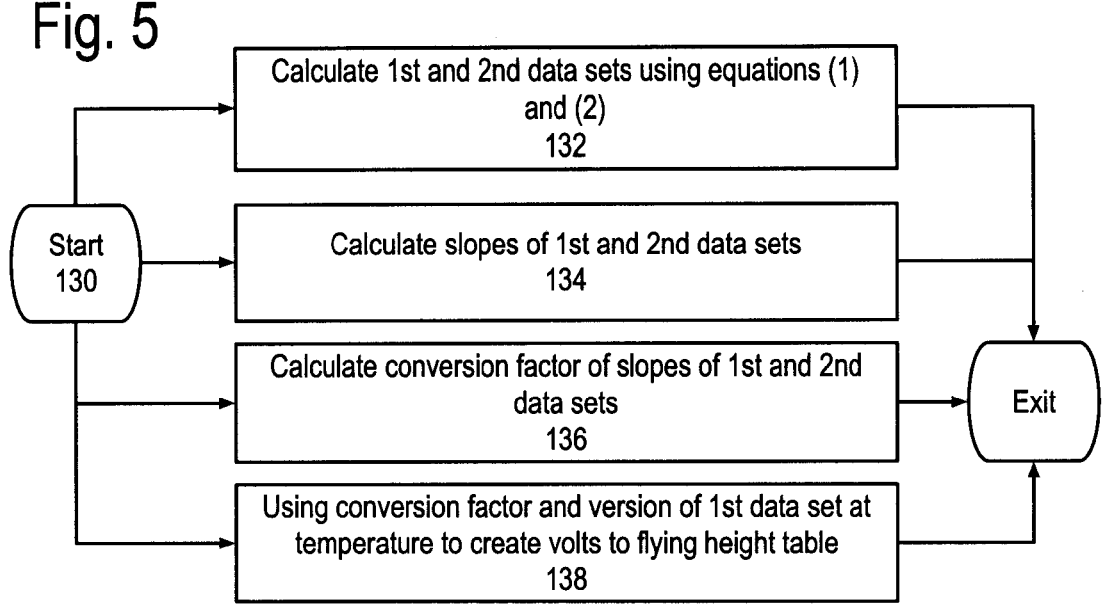
FIG. 5 shows a flowchart of the program system of FIG. 4 implementing some aspects of the invention's method by calculating the first and second data sets using equations (1) and (2), calculating the slopes of these data sets, a conversion factor between the slopes of the first and second data sets, and using the first data set at a given temperature and the conversion factor to at least partly create the volts to flying height table for that temperature.
Figure 6:
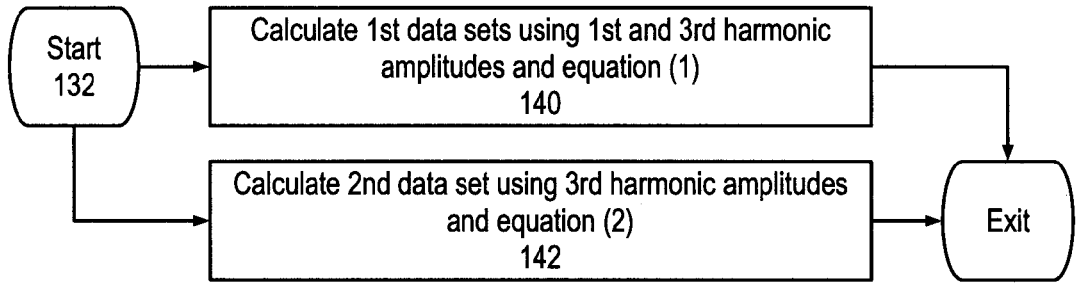
FIG. 6 shows some details of the first program step of FIG. 5, calculating the two data sets.
Figure 7:
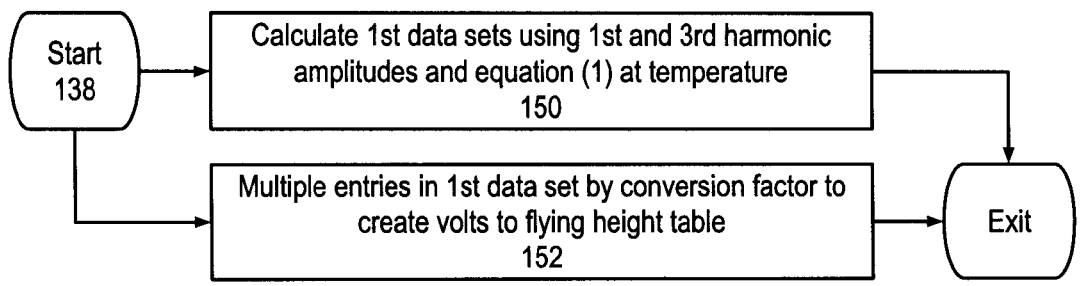
FIG. 7 shows some details of the last program step of FIG. 5, using the conversion factor and a version of the first data set to create the stimulus to flying height table. The stimulus may include, but is not limited to, voltage, current and/or combinations of voltage and current.

FIG. 5 shows a flowchart of the program system 130 of FIG. 4 implementing some aspects of the invention's method by including at least one of the following program steps: Program step 132 supports calculating the first and second data sets 106 using equations (1) and (2). A first data set is generated using the third harmonic amplitude 104 as the single tone in equation (2) to create a table of power applied to the vertical micro-actuator 24 of the slider 20 and its change in flying height over a rotating disk surface 6. A second data set is generated using the first and third harmonic amplitudes in equation (1) to create a second table of power applied to the vertical micro-actuator versus its change in flying height. Program step 134 supports calculating the slopes of these data sets. The slope of the first and second data sets, as change in flying height over power, are calculated. Program step 136 supports calculating the conversion factor 108 between the slopes of the first and second data sets. The ratio of these two slopes as a conversion factor is then determined. And program step 138 supports using the first data set at a given temperature and the conversion factor to at least partly create the volts to flying height table 110 for that temperature. The inventors find the conversion factor essentially constant across a wide range of temperatures. Once determined, the hard disk drive can be calibrated using the first and third harmonic amplitudes in equation (1) to create the table 110 and once scaled by this conversion factor, the table's results are very accurate estimates of the flying height changes for the given temperature conditions.

The hard disk drive 10 may be calibrated during manufacture and/or may further be recalibrated while in the field with this method. The calibrated hard disk drive is a product of this method. The method may be embodied as the program system 130 residing in the computer readable memory 126 for instructing a computer 122 included in the processor 62 of the hard disk drive, where the memory may or may not be included in the hard disk drive.

Normal operations of the hard disk drive include the following: When the hard disk drive 10 has been turned on and data is to be accessed in the hard disk drive, the processor 62 stimulates the spindle motor 14 to rotate the disks 12 to create the rotating disk surface 6. The processor stimulates the voice coil 42 in the voice coil motor 46 with a time-varying electrical signal, causing the voice coil to magnetically interact with the fixed magnetic assembly 44 of FIGS. 1 and 2A moving the actuator arms 48 through the actuator pivot 42 to swing the head gimbal assemblies 26, to coarsely position their sliders 20 over the track 15 on the rotating disk surface, and other micro-actuators may be further stimulated to refine that position.

Once the slider 20 is in position, when a write operation is to be performed the data 15 is written through the slider onto the rotating disk surface 6. When a read operation is to be performed, the slider is used to read the data in the track from the rotating disk surface as shown in FIG. 1 into the processor 62 as shown in FIG. 3. Often a Position Error Signal (PES) is derived from the read head of the slider to provide feedback to the processor 62 on the slider positioning over the rotating disk surface. from shortly before the start of one of these access operations, the vertical micro-actuator 24 may be stimulated to alter the flying height 28 of the slider over the rotating disk surface. Often the processor 62 uses the table 110 to determine the vertical voltage 100 asserted by the processor to create the voltage V stimulating the vertical micro-actuator.

The preceding embodiments provide examples of the invention, and are not meant to constrain the scope of the following claims.

What is claimed is:
1. A hard disk drive, comprising:
a disk base;
a spindle motor mounted on said disk base and coupled to at least one disk to create at least one rotating disk surface containing at least one track with a repeated pattern of bits;
a voice coil motor pivotably mounted to said disk base to position via a head gimbal assembly to at least one slider affected by a vertical micro-actuator at a voltage to a flying height over said track on said rotating disk surface; and
a processor stimulating said vertical micro-actuator with a vertical voltage to receive from said slider data of said track to create a first harmonic amplitude and a third harmonic amplitude, with said first harmonic amplitude and said third harmonic amplitudes used to create an entry in a first data set with equation (1)

$$\Delta d=(\lambda/4\pi)\ln(A_{a\text{-}1st}A_{b\text{-}3rd}/A_{b\text{-}1st}A_{a\text{-}3rd})$$

and said third harmonic amplitude used to create said entry in a second data set with equation (2)

$$\Delta d=(\lambda/4\pi)\ln(A_{a\text{-}1st}/A_{b\text{-}1st})$$

at said vertical voltage,
with said processor calculating a first slope of said first set and a second slope said second data set,
with said processor calculating the ratio of said first slope to said second slope to determine a conversion factor used to create a table of voltage applied to said vertical micro-actuator of said slider and said slider's change in flying height over said rotating disk surface.

2. The hard disk drive of claim 1, further comprising a circuit board mounted on said disk base opposite said voice coil motor, with said circuit board including said processor.

3. The hard disk drive of claim 1, wherein said processor includes at least one instance of at least one member of the group consisting of a finite state machine and a computer accessibly coupled to a computer readable memory containing a program system for instructing said computer and comprising at least one of the program steps of:
stimulating said vertical micro-actuator with a vertical voltage to receive from said slider data of said track to create a first harmonic amplitude and a third harmonic amplitude;
using said first harmonic amplitude and said third harmonic amplitudes used to create said entry in said first data set at said vertical voltage with equation (1)

$$\Delta d=(\lambda/4\pi)\ln(A_{a\text{-}1st}A_{b\text{-}3rd}/A_{b\text{-}1st}A_{a\text{-}3rd});$$

using said third harmonic amplitude used to create said entry in said second data set at said vertical voltage with equation (2)

$$\Delta d=(\lambda/4\pi)\ln(A_{a\text{-}1st}/A_{b\text{-}1st});$$

calculating said first slope of said first set and said second slope said second data set;
calculating the ratio of said first slope to said second slope to determine said conversion factor; and
using said conversion factor and a version of said first data set to create said table of voltage applied to said vertical micro-actuator of said slider and said slider's change in flying height over said rotating disk surface.

4. The hard disk drive of claim 1, wherein said repeated pattern of bits consists of "00001111".

5. A method comprising the step of
operating a hard disk drive, comprising the steps of:
rotating at least one disk by a spindle motor mounted on a disk base to create at least one rotating disk surface containing at least one track with a repeated pattern of bits;
positioning at least one slider by at least a voice coil motor pivoting a head gimbal assembly over a track on said rotating disk surface;
stimulating a vertical micro-actuator at a voltage to effect a change in a flying height of said slider over said track on said rotating disk surface; and
receiving from said slider data of said track to create a first harmonic amplitude and a third harmonic amplitude;
using said first harmonic amplitude and said third harmonic amplitudes to create an entry in a first data set at said vertical voltage with equation (1)

$$\Delta d=(\lambda/4\pi)\ln(A_{a\text{-}1st}A_{b\text{-}3rd}/A_{b\text{-}1st}A_{a\text{-}3rd});$$

using said third harmonic amplitude used to create said entry in a second data set at said vertical voltage with equation (2)

$$\Delta d=(\lambda/4\pi)\ln(A_{a\text{-}1st}/A_{b\text{-}1st});$$

calculating a first slope of said first set and a second slope said second data set;
calculating the ratio of said first slope to said second slope to determine a conversion factor;
using said conversion factor and a version of said first data set to create a table of voltage applied to said vertical micro-actuator of said slider and said slider's change in said flying height over said rotating disk surface.

6. The method of claim 5, further comprising the step of:
calibrating said hard disk drive to create a calibrated hard disk drive, further comprising the step of:
operating said hard disk drive to create said table of said voltage applied to said vertical micro-actuator and said slider's change in said flying height.

7. The calibrated hard disk drive as a product of the process of claim 6.

8. The table of said voltage applied to said vertical micro-actuator and said slider's change in said flying height as a product of the process of claim 5.

9. The method of claim 5, wherein said repeated pattern of bits consists of a member of the group consisting of "01011010" and "00001111".

10. A computer readable memory configured to be accessibly coupled to a computer directing the operations of a hard disk drive, wherein said computer readable memory comprises:
a program system for instructing said computer and comprising at least one of the program steps of:
stimulating a vertical micro-actuator with a vertical voltage to affect a flying height of a slider over a rotating disk surface to receive from said slider data to create a first harmonic amplitude and a third harmonic amplitude;
using said first harmonic amplitude and said third harmonic amplitude to create said entry in said first data set at said vertical voltage with equation (1)

$$\Delta d=(\lambda/4\pi)\ln(A_{a\text{-}1st}A_{b\text{-}3rd}/A_{b\text{-}1st}A_{a\text{-}3rd});$$

using said third harmonic amplitude used to create said entry in said second data set at said vertical voltage with equation (2)

$$\Delta d=(\lambda/4\pi)\ln(A_{a\text{-}1st}/A_{b\text{-}1st});$$

calculating said first slope of said first set and said second slope said second data set;
calculating the ratio of said first slope to said second slope to determine said conversion factor; and
using said conversion factor and a version of said first data set to create a table of voltage applied to said vertical micro-actuator of said slider and said slider's change in flying height over said rotating disk surface.

* * * * *